United States Patent
Bairat

(10) Patent No.: US 10,374,230 B2
(45) Date of Patent: Aug. 6, 2019

(54) METHOD OF PROVIDING ELECTRICITY TO A VEHICLE

(71) Applicant: Arya Mangesh Bairat, Milford, CT (US)

(72) Inventor: Arya Mangesh Bairat, Milford, CT (US)

(73) Assignee: Arya Mangesh Bairat, Milford, CT (US)

( * ) Notice: Subject to any disclaimer, the term of this patent is extended or adjusted under 35 U.S.C. 154(b) by 16 days.

(21) Appl. No.: 15/476,103

(22) Filed: Mar. 31, 2017

(65) Prior Publication Data
US 2018/0287221 A1    Oct. 4, 2018

(51) Int. Cl.
| H01M 8/16 | (2006.01) |
| H01M 4/38 | (2006.01) |
| H01M 4/583 | (2010.01) |
| H01M 10/36 | (2010.01) |
| H01M 2/10 | (2006.01) |
| H01M 2/16 | (2006.01) |

(52) U.S. Cl.
CPC .......... *H01M 4/387* (2013.01); *H01M 4/583* (2013.01); *H01M 10/36* (2013.01); *H01M 2/1077* (2013.01); *H01M 2/1653* (2013.01); *H01M 2/1686* (2013.01); *H01M 2220/20* (2013.01); *H01M 2300/0002* (2013.01); *H01M 2300/0005* (2013.01)

(58) Field of Classification Search
CPC ..... H01M 8/1023; H01M 8/0612; H01M 8/16
See application file for complete search history.

(56) References Cited

U.S. PATENT DOCUMENTS

| 4,084,038 | A |   | 4/1978  | Scragg et al. |
| 4,415,950 | A | * | 11/1983 | Weeks ............. C09D 5/24 29/25.03 |
| 8,227,127 | B2 |  | 7/2012  | Littke et al. |
| 8,409,420 | B2 |  | 4/2013  | Sano et al. |
| 8,413,420 | B1 |  | 4/2013  | Zaromb |
| 8,518,680 | B2 |  | 8/2013  | Kuhry et al. |
| 8,596,047 | B2 |  | 12/2013 | Shawabkeh et al. |
| 8,764,964 | B2 |  | 7/2014  | Rau |
| 8,936,005 | B2 |  | 1/2015  | Gruber et al. |
| 9,045,337 | B2 |  | 6/2015  | Kuku |
| 9,249,030 | B2 |  | 2/2016  | Peterson et al. |
| 9,273,020 | B2 |  | 3/2016  | Schjodt et al. |
| 9,285,116 | B2 |  | 3/2016  | Schmid et al. |
| 9,469,539 | B2 |  | 10/2016 | Chew |

(Continued)

OTHER PUBLICATIONS

Arya Barait Poster Presentation at the CT Invention Convention; Apr. 30, 2016.

*Primary Examiner* — Olatunji A Godo
(74) *Attorney, Agent, or Firm* — Cantor Colburn LLP

(57) ABSTRACT

Disclosed is a method of providing electricity to a vehicle comprising (1) providing an aqueous, ionic solution of carbon dioxide or carbonic acid, or a combination of the two, wherein the source of ions is an acid, an alkali metal salt, an alkaline earth metal salt, or a combination comprising one or more of the foregoing; (2) electrolyzing the aqueous, ionic solution to provide electricity, wherein the electrolysis process proceeds by the conversion of the carbon dioxide or carbonic acid to bicarbonate ions and carbonate ions; and (3) powering a vehicle with that electricity.

9 Claims, 5 Drawing Sheets

(56) References Cited

U.S. PATENT DOCUMENTS

| | | | |
|---|---|---|---|
| 2005/0258049 A1* | 11/2005 | Klein | C25B 9/06 |
| | | | 205/630 |
| 2008/0248350 A1* | 10/2008 | Little | C25B 1/04 |
| | | | 429/443 |
| 2010/0260653 A1* | 10/2010 | Jones | B01D 53/1418 |
| | | | 423/225 |
| 2011/0036919 A1 | 2/2011 | Baird | |
| 2015/0047989 A1 | 2/2015 | Huang | |

* cited by examiner

METHOD OF PROVIDING ELECTRICITY TO A VEHICLE

BACKGROUND

The demand for electric powered vehicles is increasing worldwide. For example, electric cars are an upcoming, sustainable commodity, promoting green energy. The need for inexpensive, widely available sources of electric power for such vehicles is increasing. Separately, increasing levels of carbon dioxide in the atmosphere is a serious problem. The need for removing carbon dioxide from the atmosphere thus exists. The present invention provides a solution to both of these needs.

BRIEF DESCRIPTION

One embodiment is drawn to a method of providing electricity to a vehicle comprising (1) providing an aqueous, ionic solution of carbon dioxide or carbonic acid, or a combination of the two, wherein the source of ions is an acid, an alkali metal salt, an alkaline earth metal salt, or a combination comprising one or more of the foregoing; (2) electrolyzing the aqueous, ionic solution to provide electricity, wherein the electrolysis process proceeds by the conversion of the carbon dioxide or carbonic acid to bicarbonate ions and carbonate ions; and (3) powering a vehicle with that electricity.

Another embodiment is drawn to an electrochemical cell for electrolyzing the aqueous, ionic solution, wherein the electrochemical cell comprises at least one electrochemical structure comprising (a) at least one anode; (b) at least one cathode; and (c) at least one electrolysis separator between each anode and the cathode, wherein the electrochemical cell initially contains an aqueous, acidic solution of carbon dioxide or carbonic acid, or a combination of the two, with an acid and an alkali metal salt or alkaline earth metal salt present, wherein the electrolysis process proceeds by the conversion of the carbon dioxide or carbonic acid to bicarbonate ions and carbonate ions.

Still other embodiments are drawn to a vehicle equipped with one or more above-noted electrochemical cells or a electrical power station for vehicles equipped with one or more above-noted electrochemical cells.

The above described and other features are exemplified by the following figures and detailed description.

BRIEF DESCRIPTION OF THE DRAWINGS

Refer now to the figures, which are exemplary embodiments, and wherein the like elements are numbered alike.

Figure 1:
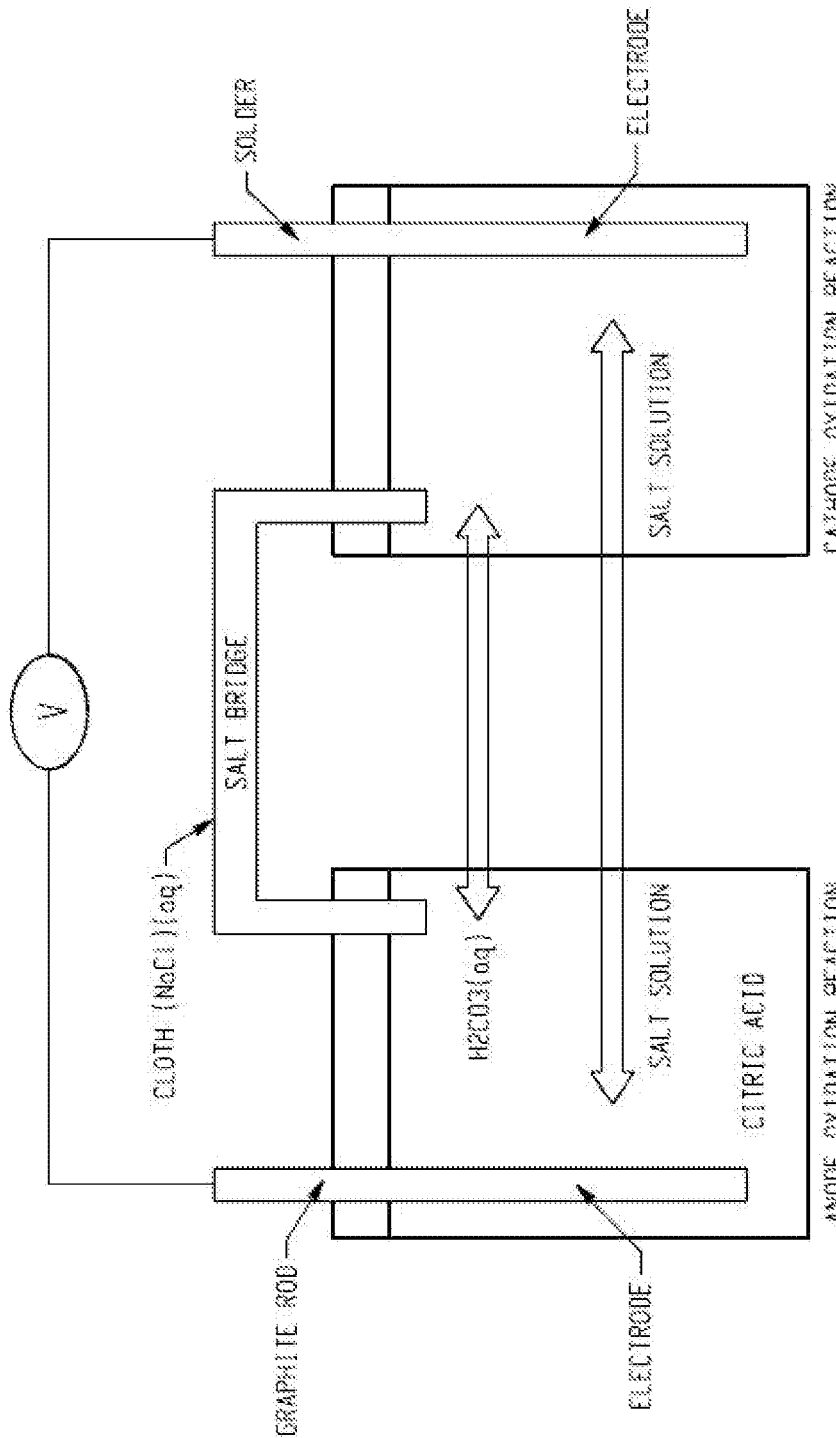
FIG. 1 is a schematic drawing of one embodiment of an electrochemical cell useful herein.

The embodiments illustrated by this FIGS. 1 to 6 and other embodiments will be discussed in the following Detailed Description.

DETAILED DESCRIPTION

Disclosed herein are several embodiments directed to methods of providing electricity to a vehicle wherein an aqueous, ionic solution of carbon dioxide or carbonic acid, or a combination of the two, is electrolyzed to provide electricity, wherein the electrolysis process proceeds by the conversion of the carbon dioxide or carbonic acid to bicarbonate ions and carbonate ions; and powering a vehicle with that electricity.

Also disclosed herein are several embodiments directed to electrochemical cells for electrolyzing the aqueous, ionic solution of carbon dioxide or carbonic acid, or a combination of the two, wherein the electrochemical cells comprise an anode chamber having an anode and contains an aqueous, acidic solution of carbon dioxide or carbonic acid, or a combination of the two, with an acid present; (an cathode chamber having an cathode and initially contains an aqueous solution of an alkali metal salt; and an electrolysis separator between the anode chamber and the cathode chamber, wherein the electrolysis process proceeds by the conversion of the carbon dioxide or carbonic acid to bicarbonate ions and carbonate ions.

Also disclosed are embodiments directed to vehicles that can be equipped with one or more of these electrochemical cells. And also disclosed are embodiments disclosed with electric power stations for charging vehicles that utilize one or more of these electrochemical cells.

The phrase "aqueous, ionic solution of carbon dioxide or carbonic acid, or a combination of the two" as used in the present specification and claims means any aqueous solution containing carbon dioxide values or carbonic acid values, or a combination of the two, that can be subjected to electrolysis and also contains ionic values derived from an acid or an alkali metal salt (e.g., sodium or potassium salts) or an alkaline earth metal salt (e.g., calcium or magnesium).

The purpose of having these ionic values in this aqueous, ionic solution is to increase the ionic conductivity of the cell, thereby allowing for more efficient ion transfer during electrolyzing process in the electrochemical cell. For some embodiments, these ionic values may be termed electrolytes. Any acid suitable for the present electrolyzing process may be used. Because of its low cost and high dissociation constant, citric acid is particularly suitable. Alternatively, the source of acid can be fruit juice acids (e.g., lemon juice).

Any alkali metal salt or alkaline earth metal salt that is suitable for this electrolysis process can be used. Sodium chloride is especially suitable because of its low cost and high dissociation constant.

The amounts of acids, alkali metal salts or alkaline earth metal salts are not critical and will be dependent upon the particular design of the electrochemical cell that they are used in.

The terms "electrolyze" or "electrolyzing" as used in the present specification and claims is used to mean any method that converts an aqueous, ionic solution of carbon dioxide or carbonic acid or both into electricity.

The term "electrochemical cell" as used in the present specification and claims is used to mean any type of electrochemical cell that converts an aqueous, ionic solution of carbon dioxide carbonic acid into electricity. The electrochemical cell can include (a) an anode chamber having an anode and initially contains an aqueous, acidic solution of carbon dioxide or carbonic acid, or a combination of the two, with an acid present; (b) an cathode chamber having an cathode and initially contains an aqueous solution of an alkali metal salt; and (c) an electrolysis separator between the anode chamber and the cathode chamber, wherein the electrolysis process proceeds by the conversion of the carbon dioxide or carbonic acid to bicarbonate ions and carbonate ions.

The size and design of the present electrochemical cell will depend upon the application that it is intended.

The anode can be any suitable material that allows the aqueous, ionic solution of carbon dioxide or carbonic acid, or a combination of the two, to be electrolyzed. Graphite is a particularly suitable material for the anode. A graphite rod is especially suitable as an anode. Alternatively, a composite of graphite paint and a cement-type glue can be used as the anode. The size and shape of the anode will depend upon the application for which it is intended.

The cathode can be any suitable material that allows the electrolysis of the aqueous, ionic solution of carbon dioxide or carbonic acid, or a combination of the two, to be carried out. A metal solder such as a commercially available, thermoelectric metal alloy can be used as the cathode. A silver-plated tin-copper metal alloy commonly used in electric circuitry and available from Radio Shack is one example of such suitable material. The electrical or voltage output is through the cathode. The size and shape of the cathode will depend upon the application for which it is intended.

The separator can be any suitable material that allows the aqueous, ionic solution of carbon dioxide or carbonic acid, or a combination of the two, to be electrolyzed. For some embodiments, a simple metal mesh sieve can be used as the separator. The distinct net design on a metal mesh sieve allows for ions to travel through it, providing maximum conductivity. In other embodiments, a polyethylene sheet can be used with the metal mesh sieve to provide electrode disjunction (acts as a dielectric). For commercial embodiments, any conventional diaphragm or membrane material can be used as the separator. The size and shape of the separator as well as the material used will depend upon the application for which it is intended.

The material used for the walls of the electrochemical cell can be any material that allows the electrolysis of the aqueous, ionic solution of carbon dioxide or carbonic acid, or a combination of the two, to be carried out. The wall material would depend upon the particular application intended.

Without being bound to any particular electrochemical mechanism, it is believed that the carbon dioxide or carbonic acid in the presence of water and these ionic values and the electrical driving force in the electrochemical cell will be first converted into bicarbonate ions ($HCO_3^-$). As the pH of the aqueous solution rises, these bicarbonates become carbonate ions ($CO_3^-$). As the higher the carbon dioxide pressure in the cell increase and pH rises, the number of ions increase in the solution and causing a voltage output from the cell due to ionic conductivity. Concurrently, the presence of acid can also absorb carbon dioxide gas in the solution, allowing for higher carbon dioxide or carbonic acid concentration in the water, further increasing ionic conductivity and thus more voltage output from the electrochemical cell.

Figure 2:
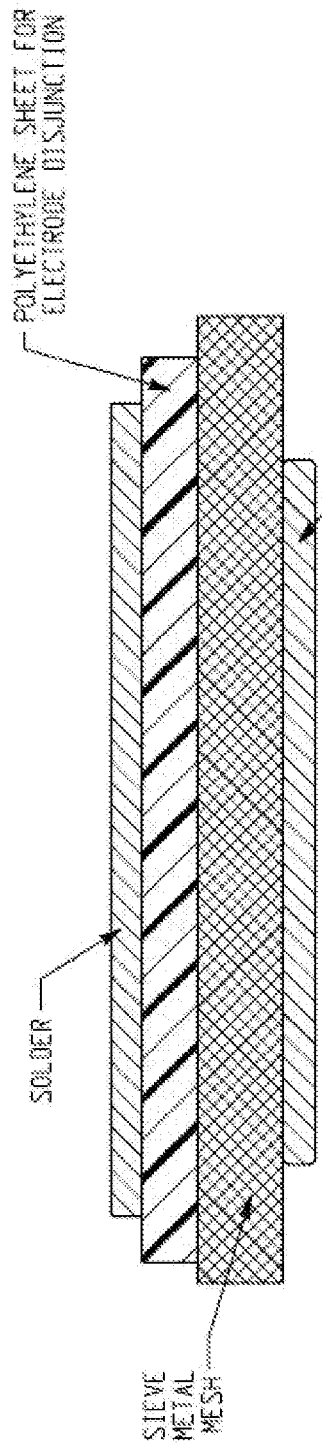
FIG. 2 is a schematic drawing of an electrochemical structure useful herein having a graphite rod anode and a solder cathode with a metal mesh sieve and a polyethylene sheet of electrode separation or disjunction.
Figure 3:
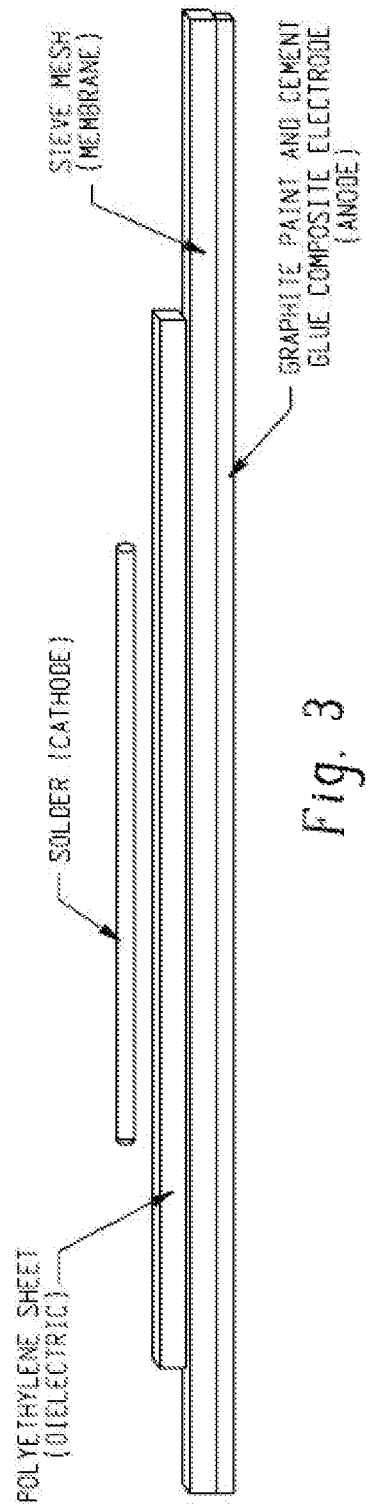
FIG. 3 is a schematic drawing of an electrochemical structure useful herein having a graphite paint and cement glue composite anode and a solder cathode with a metal mesh sieve and a polyethylene sheet useful for electrode separation or disjunction.

FIGS. 2 and 3 illustrate embodiments of electrochemical structures that can be used in an electrochemical cell useful herein. FIG. 2 shows an electrochemical structure useful herein having a graphite rod anode and a solder cathode with a metal mesh sieve and a polyethylene sheet for electrode separation or disjunction. This structure is simple to construct and relatively inexpensive.

FIG. 3 shows an electrochemical structure useful herein having a graphite paint and cement glue composite anode and a solder cathode with a metal mesh sieve and a polyethylene sheet of electrode separation or disjunction. This structure is simple to construct and can be even more inexpensive than the structure of FIG. 2.

Figure 4:
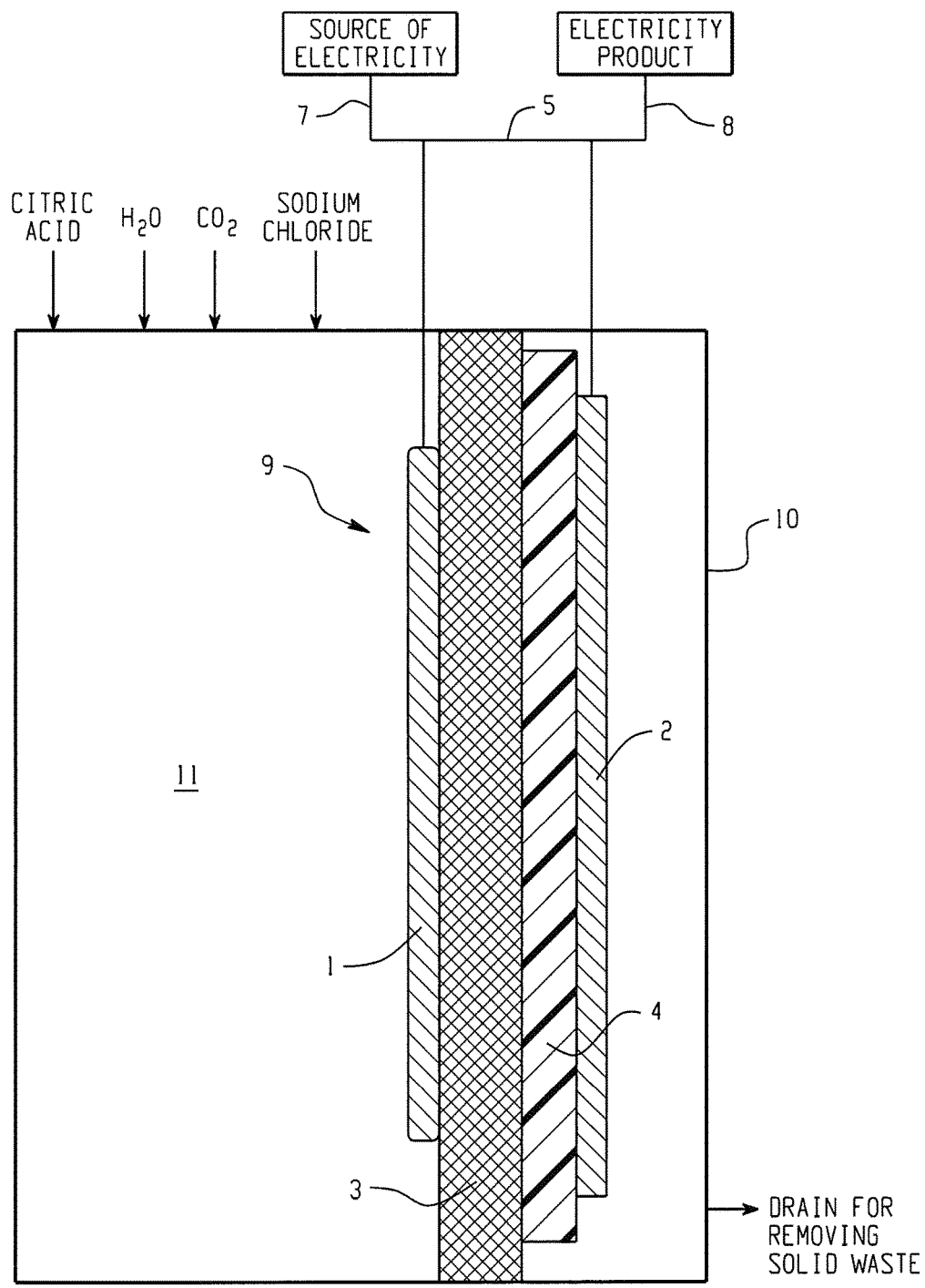
FIG. 4 is a schematic drawing of an electrochemical cell useful herein having an electrical structure of FIG. 3 therein.
Figure 5:
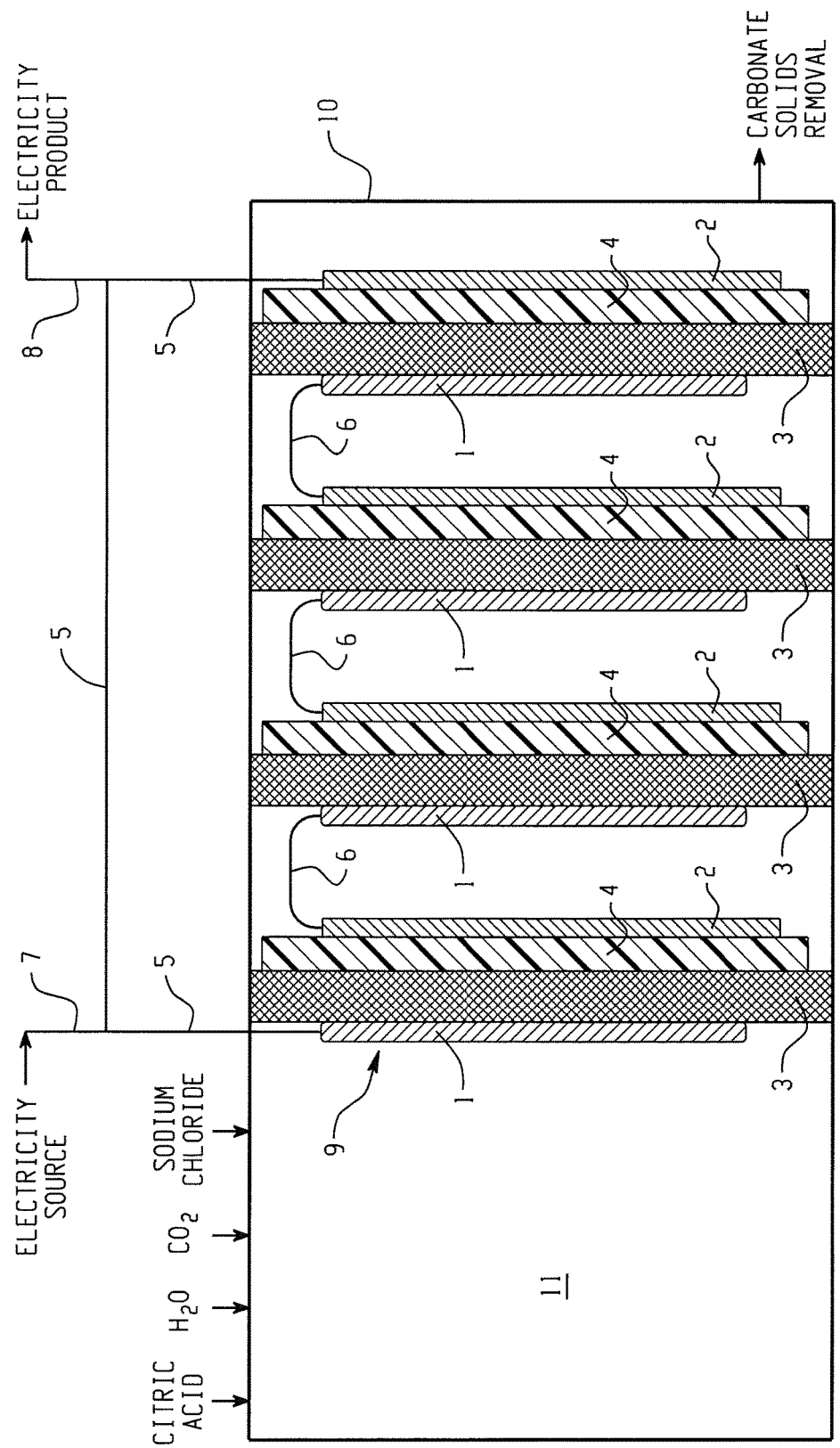
FIG. 5 is a schematic drawing of an electrochemical cell useful herein having four electrical structures of FIG. 3 therein.
Figure 6:
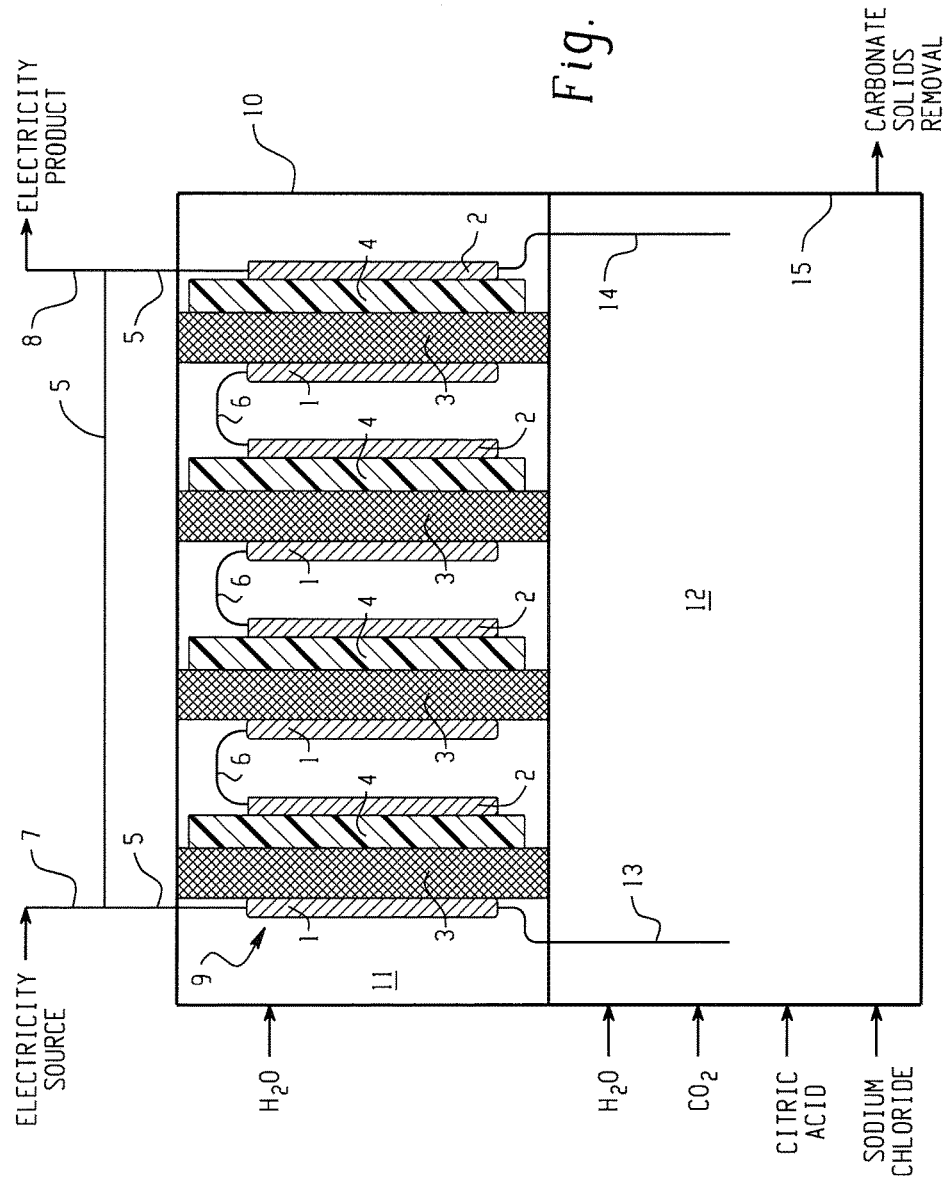
FIG. 6 is a schematic drawing of an electrochemical cell useful herein having four electrical structures of FIG. 3 therein with a separate chamber where the carbon dioxide is converted to first bicarbonate ions and the carbonate ions.

FIG. 4 illustrates an electrochemical cell 11 having a single electrochemical structure 9 of FIG. 3 contained therein. This electrochemical cell 11 has walls 10 and provides input means for carbon dioxide (or carbonic acid, or the combination of both), water, citric acid and sodium chloride as well as an output means for removing carbonate solids that may be formed during the electrochemical process. The electrochemical structure 9 contains a graphite paint and cement glue composite anode 1 and a solder cathode 2 with a metal mesh sieve 3 and a polyethylene sheet 4 for electrode separation or disjunction. The electrochemical cell 11 is also equipped with electrical circuitry 5 (typically copper wiring) for connecting the anode 1 with the cathode 2 as well as electrical wiring 7 to connect the electrochemical cell to an electric power source such as a renewable energy source such as solar or wind power as well as electrical wiring 8 to drawn off excess electricity produced by the electrochemical reaction in the electrochemical cell. This electricity product is then used to power one or more vehicles. In the case of a electrochemical cell 11 located on a vehicle, the drawn off electricity product can be transferred to either an electric motor in the vehicle or sent to a storage battery on the vehicle before being used in the electric motor, For some embodiments, the electrochemical cell employed can include more than one anode and more than one cathode. Examples of this can include commercial voltaic pile. A voltaic pile system stacks smaller electrochemical cells on top of each other, with the electrodes touching the respective opposite, resulting into a dilated electrochemical cell. This set up allows for an greater electrical output since it replaces one cell, with more than one cell (e.g. 6 cells) stacked on top of each other or connected to each other. FIGS. 5 and 6 illustrate electrochemical cells 11 that contain a multiple of electrical structures 9. While FIGS. 5 and 6 show 4 electrochemical structure in the cell, other embodiments may use different numbers of electrochemical structures in the cell. These electrical structures can be the electrical structures of either FIG. 2 or 3 and have similar input means and output means as illustrated in FIG. 4. In FIGS. 5 and 6, the electric structures 9 are connected by means of electrical circuity 6 that connects cathodes 2 on one electrochemical structure to an anode 1 on an adjacent but different electrochemical structure. FIG. 5 illustrates the electrochemical reaction occurring in the anode and cathode chambers of the electrochemical cell 11. FIG. 6 illustrates the electrochemical reaction occurring outside the anode and cathode chambers of the electrochemical cell 11 in a separate chamber 12 with walls 15 where the electrochemical reaction of the conversion of carbon dioxide or carbonic acid, or a combination of the two, to bicarbonates and carbonates is directed by electric circuitry 13 from an anode 1 and electric circuitry 14

The term "carbonic acid" as used in the present specification and claims means the chemical compound with the chemical formula $H_2CO_3$ (equivalently $OC(OH)_2$). Solutions of carbon dioxide in water (carbonated water) can contain small amounts of carbonic acid. Carbonic acid, which is a weak acid, forms two kinds of salts, bicarbonates and carbonates.

The term "carbon capture unit" as used in the present specification and claims means any facility that captures or stores carbon dioxide from a point source, such as a fossil fuel or biomass energy facility, so it cannot enter the atmosphere. Photo-chemical reactions such as photosynthesis can be used to capture and store the carbon dioxide. In utilizing carbon capture units herein, the captured carbon dioxide in such units provides a source of the carbon dioxide or carbonic acid for the aqueous, ionic solution of the carbon dioxide or carbonic acid. The size of the carbon capture unit is not critical. It may be a relatively large unit that could be used with relative large electrochemical cell for the supplying of electricity for a multitude of vehicles such as an electricity supply station where vehicles can periodically take in electricity (via batteries and the like) to power themselves. Alternatively, it could be a relatively small unit that could be located in a single vehicle. For some embodiments, such carbon capture units may be pressurized to provide larger amounts of carbon dioxide per unit volume for supplying the electrochemical cell. In some embodiments, the electrochemical cell and its components could be recyclable.

The term "vehicle" as used in the present specification and claims means any type of vehicle that could be powered by electricity. Examples include cars, trucks, motorcycles, bicycles, trains, planes and the like. Vehicles also include vehicles that are also powered by other means such as internal combustion engine (e.g., a hybrid car).

In one specific embodiment, a vehicle could have a carbon capture unit (e.g., a small pressurized carbon dioxide tank) and also be equipped with an electrochemical cell wherein the carbon dioxide is electrolyzed in the form of the aqueous, ionic solution to generate electricity to power the vehicle. For some embodiments, the vehicle can also contain a first set of one or more batteries to store the generated electricity before using that electricity to power the vehicle. Furthermore, the vehicle can also contain a second set of batteries that are used to supply electricity for the electrochemical cell. The electricity for supplying this second set of batteries can come from a renewable energy source such as a solar energy source or a wind turbine, combinations of one or more of different types of renewable energy sources attached to the vehicle (e.g., a solar panel attached to the roof as well as one or more small wind turbines attached to that car) or external to the vehicle.

In another specific embodiment, the carbon capture unit could be a relatively large tank attached to a fossil fuel or biomass energy facility that generates large amounts of carbon dioxide during operation. This tank collects the gaseous or solid carbon dioxide effluent from that facility. This large carbon dioxide-containing tank can be connected or transferred to a power station one or more large electrochemical cells wherein the carbon dioxide is electrolyzed in the form of the aqueous, ionic solution to generate electricity. This power station can also contain batteries for storing this electricity or supply means for releasing this electricity to vehicles, or a combination of the foregoing.

Large installations of the present methods or electrochemical cells would have the advantages of higher result in higher electricity output. Moreover, the material used to make the electrochemical cells herein could be made of recyclable materials or disposable materials that would lower the capital costs of such electrochemical cells.

The present invention is further illustrated by the following embodiments.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

A laboratory size working example is illustrated by FIG. 1 and the following:

The following materials can be used for this example: graphite rod (0.5" diameter×12") anode; Solder (Tin-Copper-Silver (Radio-shack) cathode); (2) 400 mL beakers to be used as half cells; a regular Cloth soaked with sodium chloride (Salt Bridge) (9"×8");citric acid in the form of lemon juice; sodium chloride (note that calcium chloride or sodium bicarbonate can be added instead); a solar cell for supplying electricity to the electrochemical cell; dry ice: water (800 mL). After the electrolyzation period, a multimeter was used to check the voltage output, and amperage. Alligator clips and wires were used to connect the solar cell to the anode and cathode. They were also later used to collect the voltage and, amperage once it is attached to the multimeter (not the solar cell anymore.) Both times the alligator clips attached the anode and cathode to a source (multimeter or solar cell). Alternatively, a 9 volt cell could have used instead of the solar cell for this experiment. The following steps were conducted to demonstrate this example: 1.) Pour 300 mL of water in each half cell-Respective 400 mL beaker; 2.) Place one piece of dry ice in each cell (and re-put of relative size in each half cell if dry ice melts); 3.) Put the Graphite Rod (12") in Half Cell (1) that acts as the anode chamber; 4.) Cut the Solder at 12" and fold bottom up to 7"—Approximately Half size and place it in Half Cell (2) that acts as the cathode chamber; 5.) Put the respective electrolyte (Calcium Chloride, Sodium Chloride, Sodium Bicarbonate) (3.5 tablespoons) in both Half Cells. Add 25 mL citric acid as well to both half cells; 6.) Electrolyze each solution by the through a 9V battery or through a solar cell (if sunlight is present [preferred]) for 10 minutes. This is done by attaching the alligator clips internally/externally to the solar cell and on the respective electrode. (This is done to catalyze the reaction); 7.) Remove electrical activation energy (solar-cell); 8.) Use the regular cloth (fold cylindrically) and place it in each half cell (This is coated with the electrolyte tested (100 mL of water mixed with 3.5 tablespoons of each electrolyte in separate beaker); 9.) Attach alligator clips and wires to each electrode and use a multimeter to measure voltage. The results were that calcium chloride at 600 seconds of electrolysis time resulted 651 mV output, the sodium chloride at 600 seconds resulted in 742 mV output, and the sodium bicarbonate at 600 seconds resulted in 701 mV output.

Further testing was constructed using a smaller laboratory electrochemical cell n the form of a vertical voltaic cell based on the electrochemical structure in FIG. 2 with a graphite rod anode and a solder metal cathode with a polyethylene sheet acting as separator (dielectric) and sieve mesh acting as the semipermeable membrane in a glass vessel The following steps can be conducted to demonstrate this example: 1) Take a sieve mesh (4"×3"×1 mm) and lay it flat. 2) Place a polyethylene sheet covering the sieve mesh thoroughly on the respective side. 3) Pour Sodium Chloride aqueous solution (10 mL+1 tablespoon) on the polyethylene sheet for each sheet of each cell. 4) Drop, Citric Acid (5 mL) on the polyethylene sheet. [Steps 3+4 were configured through personal preference. Various molarities of electrolytes would allow for a more viable electric source.] 5) Place the cathode (silver solder of 5.4 cm length×1 mm diameter) on top of the polyethylene (stick by making tiny hole on the side (1 cm margin on left of polyethylene sheet). 6) The anode should be attached on the other half of the sieve mesh. 7) The $CO_2$ aqueous solution (30 mL solution mix) should also be submerged on the polyethylene sheet. 8) The cell is bonded via a foam tape attaching only the graphite rod to the sieve mesh. 9) Then repeat process steps 1-8 six times for each individual electrochemical structure and stack each of these 6 electrochemical structures on top of each other to create a vertical voltaic pile of 6 electrochemical structures. The graphite rod will be on bottom the bottom of each electrochemical structure.

Alternatively, this vertical voltaic pile can be made using a graphite paint and cement glue composite electrode as the anode instead of the graphite rod anode, for flexibility of the battery, and the cement glue was to assure durability/prevent flaking. A graphite paint glue electrode was fabricated with a ratio of graphite powder (ordered from Flinn Scientific) to regular water ($H_2O$) at room temperature (70 degrees Fahrenheit) was 1:2 (12.5 milliliters:25 milliliters) (these were measured in a graduated cylinder), and the constituents were stirred in a 200-milliliter beaker for 5 minutes thoroughly (recorded via stopwatch.) After the 5 minutes stirring ceased. For electrode preparation, ratio of graphite-water: cement glue was 2:1 (25 milliliters:12.5 milliliters), and the previous stirring procedure was followed (constituents mixed in same beaker). The final composite electrode was fabricated on the sieve mesh at a height of approximately 1 mL through consistent paint on techniques, via oscillating to maintain constant thickness. The electrolytes were the same as all the other prototypes, and the procedures used were also the same (except for new paint on fabrication.) Dimensions were as follows, and the composite electrode used in this prototype had the same length and width as the sieve mesh, and was 1 mm thick. This provided a voltage of 1.5 V in a voltaic pile fashion (12 connected in a circuit via copper wire at anode and cathode), and a current of 12 milli-amps.

Alternatively, a horizontal voltaic pile could be created using the combined electrochemical structures as shown in FIG. 5 or 6.

The present invention is also drawn to the following embodiments:

Embodiment 1. A method of providing electricity to a vehicle comprising (1) providing an aqueous, ionic solution of carbon dioxide or carbonic acid, or a combination of the two, wherein the source of ions is an acid, an alkali metal salt, an alkaline earth metal salt, or a combination comprising one or more of the foregoing; (2) electrolyzing the aqueous, ionic solution to provide electricity, wherein the electrolysis process proceeds by the conversion of the carbon dioxide or carbonic acid to bicarbonate ions and carbonate ions; and (3) powering a vehicle with that electricity.

Embodiment 2. The method of claim 1, wherein the energy used to run the electrolyzing step is from a renewable energy source.

Embodiment 3. The method of any of Embodiments 1 or 2, wherein the renewable energy source is a solar energy source or a wind energy source.

Embodiment 4. The method of any of Embodiments 1-3, wherein the source of the carbon dioxide or the carbonic acid in the aqueous, ionic solution is either by adding dry ice to water, by providing a carbonated water solution, or by adding carbon dioxide from a carbon capture unit to water.

Embodiment 5. The method of any of Embodiments 1-4, wherein the source of the ions is a combination of an acid and an alkali metal salt.

Embodiment 6. The method of Embodiment 5, wherein the acid is citric acid or a fruit juice solution.

Embodiment 7. The method of Embodiment 5, wherein the alkali metal salt is sodium chloride.

Embodiment 8. The method of any of the Embodiments 1-7, wherein graphite is present in the aqueous, ionic solution during electrolysis.

Embodiment 9. An electrochemical cell for electrolyzing the aqueous, ionic solution of any of the Embodiments 1-7, wherein the electrochemical cell comprises at least one electrochemical structure comprising (a) at least one anode; (b) at least one cathode; and (c) at least one electrolysis separator between each anode and the cathode, wherein the electrochemical cell initially contains an aqueous, acidic solution of carbon dioxide or carbonic acid, or a combination of the two, with an acid and an alkali metal salt or alkaline earth metal salt present, wherein the electrolysis process proceeds by the conversion of the carbon dioxide or carbonic acid to bicarbonate ions and carbonate ions.

Embodiment 10. The electrochemical cell of Embodiment 9, wherein the acid is citric acid or a fruit juice solution.

Embodiment 11. The electrochemical cell of any of Embodiments 9 or 10, wherein the alkali metal salt is sodium chloride.

Embodiment 12. The electrochemical cell of any of Embodiments 9-11, wherein the electrolysis separator is a combination of a polyethylene sheet acting a dielectric and a metal mesh sieve.

Embodiment 13. The electrochemical cell of any of Embodiments 9-11, wherein the electrolysis separator is a membrane or diaphragm.

Embodiment 14. The electrochemical cell of any of Embodiments 9-13, wherein the anode is a graphite rod or a graphite paint cement glue composite.

Embodiment 15. The electrochemical cell of any of Embodiments 9-14, wherein the cathode is solder.

Embodiment 16. The electrochemical cell of Embodiment 9, wherein the electrochemical cell comprises at least one electrochemical structure comprising (a) at least one graphite rod or a graphite paint cement glue composite. anode; (b) at least one solder cathode; and (c) at least one electrolysis separator between each anode and the cathode, a combination of a polyethylene sheet acting a dielectric and a metal mesh sieve; wherein the electrochemical cell initially contains an aqueous, acidic solution of carbon dioxide or carbonic acid, or a combination of the two, with citric acid and sodium chloride present, wherein the electrolysis process proceeds by the conversion of the carbon dioxide or carbonic acid to bicarbonate ions and carbonate ions.

Embodiment 17. The electrochemical cell of Embodiment 9, wherein more than one electrochemical structures are present in the form of a voltaic pile system.

Embodiment 18. A vehicle equipped with one or more electrochemical cells of any of Embodiments 9-14.

Embodiment 19. A electrical power station for vehicles equipped with one or more electrochemical cells of any of Embodiments 9-17.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

In general, the compositions, methods, and articles, and claims can alternatively comprise, consist of, or consist essentially of, any appropriate components herein disclosed. The invention can additionally, or alternatively, be formulated so as to be devoid, or substantially free, of any components, materials, components, adjuvants or species used in the prior art compositions or that are otherwise not necessary to the achievement of the function and/or objectives of the present invention.

All ranges disclosed herein are inclusive of the endpoints, and the endpoints are independently combinable with each other (e.g., ranges of "up to 25 wt. %, or, more specifically, 5 wt. % to 20 wt. %," is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or" unless clearly indicated otherwise by context. Reference throughout the specification to "some embodiments", "another embodiment", "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements can be combined in any suitable manner in the various embodiments.

All references cited herein are incorporated by reference in their entirety.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

I claim:

1. A method of providing electricity to a vehicle comprising (1) providing an aqueous, ionic solution of carbon dioxide or carbonic acid, or a combination of the two; (2) electrolyzing the aqueous, ionic solution to provide electricity, wherein the electrolysis process proceeds by the conversion of the carbon dioxide or carbonic acid to bicarbonate ions and carbonate ions; and (3) powering a vehicle with that electricity,
   wherein energy used to run the electrolyzing step is from a solar cell,
   wherein the source of the carbon dioxide or the carbonic acid in the aqueous, ionic solution is either by adding dry ice to water, or by adding carbon dioxide from a carbon capture unit to water,
   wherein the source of ions is a combination of
      citric acid, a graphite powder and cement glue electrode, and NaCl solution; or
      citric acid, a graphite powder and cement glue electrode, and solid sodium chloride, and
   wherein graphite is present in the aqueous, ionic solution during electrolysis.

2. An electrochemical cell for providing electricity according to the method of claim 1, wherein the electrochemical cell comprises a plurality of electrochemical structures present in a form of a voltaic pile system, each of the electrochemical structures comprising (a) at least one anode comprising a graphite rod or a graphite paint cement glue composite; (b) at least one cathode comprising tin-copper-silver solder; and (c) at least one electrolysis separator between each anode and the cathode, wherein the electrolysis separator is a combination of a low density polyethylene sheet acting as a dielectric and a metal mesh sieve, wherein the electrochemical cell initially contains the aqueous, acidic solution of carbon dioxide or carbonic acid, or a combination of the two, with the citric acid and the NaCl solution or solid sodium chloride present, wherein the electrolysis process proceeds by the conversion of the carbon dioxide or carbonic acid to bicarbonate ions and carbonate ions.

3. A vehicle equipped with one or more electrochemical cells of claim 2, wherein each electrochemical cell comprises twelve of the electrochemical structures.

4. An electrical power station for vehicles equipped with one or more electrochemical cells of claim 2, wherein the electrical power station comprises two or more piles, each of the piles comprising six or more of the electrochemical structures connected in parallel.

5. The electrochemical cell of claim 2, wherein the tin-copper-silver solder has dimensions 5.4 centimeters length ×1 millimeter diameter and the metal mesh sieve has dimensions 4 inches ×3 inches ×1 millimeter.

6. An electrochemical cell for providing electricity to a vehicle, comprising a plurality of electrochemical structures present in a form of a voltaic pile system, each of the electrochemical structures comprising (a) at least one anode comprising a graphite rod or a graphite paint cement glue composite; (b) at least one cathode comprising tin-copper-silver solder; and (c) at least one electrolysis separator between each anode and the cathode, wherein the electrolysis separator is a combination of a low density polyethylene sheet acting as a dielectric and a metal mesh sieve, wherein the electrochemical cell initially contains an aqueous, acidic solution of carbon dioxide or carbonic acid, or a combination of the two, with citric acid and NaCl solution or solid sodium chloride present, wherein the electrolysis process proceeds by the conversion of the carbon dioxide or carbonic acid to bicarbonate ions and carbonate ions.

7. A vehicle equipped with one or more electrochemical cells of claim 6, wherein each electrochemical cell comprises twelve of the electrochemical structures.

8. An electrical power station for vehicles equipped with one or more electrochemical cells of claim 6, wherein the electrical power station comprises two or more piles, each of the piles comprising six or more of the electrochemical structures connected in parallel.

9. The electrochemical cell of claim 6, wherein the tin-copper-silver solder has dimensions 5.4 centimeters length ×1 millimeter diameter and the metal mesh sieve has dimensions 4 inches ×3 inches ×1 millimeter.

\* \* \* \* \*